United States Patent Office 3,166,552
Patented Jan. 19, 1965

3,166,552
PREPARATION OF 9(11)-DEHYDROTIGOGENIN
Joseph Elks and Leslie Stephenson, London, England, assignors to Glaxo Laboratories Limited, Greenford, England, a British company
No Drawing. Filed July 5, 1963, Ser. No. 293,170
Claims priority, application Great Britain, July 9, 1962, 26,294/62
5 Claims. (Cl. 260—239.55)

This invention is concerned with improvements in or relating to the reduction of steroid ketones.

It has been proposed to reduce 9(11)-dehydro-12-keto steroids to the corresponding 9(11)-dehydro-12-desoxy steroids, e.g. the reduction of 9(11)-dehydrohecogenin acetate to 9(11)-dehydrotigogenin acetate, by the Wolff-Kishner reduction. The yield obtained may be as high as 75% but the product tends to be contaminated with some 11-dehydro steroid.

It has been further proposed to reduce 9(11)-dehydro-12-keto steroids to the corresponding 9(11)-dehydro-12-desoxy steroids by forming the ethylenedithioketal of the keto steroid and reducing the dithioketal by means of Raney nickel in ethanol. This process leads to overall yields of the order of 70% of good quality material but suffers from the disadvantage that a very large quantity of Raney nickel is required, thus making the process unsuitable for large scale use.

We have now found that it is possible to obtain high yields of good quality 9(11)-dehydro-12-desoxy steroids from the corresponding 9(11)-dehydro-12-keto steroids by formation of a dithioketal of the latter compound followed by reduction thereof in the manner specified below. The resulting 9(11)-dehydro-12-desoxy steroids may be used as precursors for the process according to United States Patent No. 3,040,034 of R. M. Evans et al. issued June 19th, 1962.

According to the invention there is provided a process for the reduction of a 9(11)-dehydro-12-keto steroid to the corresponding 9(11)-dehydro-12-desoxy steroid which comprises forming a dithioketal, preferably the ethylene dithioketal, of the 9(11)-dehydro-12-keto steroid and reducing this to the corresponding 9(11)-dehydro-12-desoxy steroid by means of an alkali metal or alkaline earth metal in liquid ammonia, a primary amine containing 1–5 carbon atoms or a polymethylene diamine.

The dithioketal of the 9(11)-dehydro-12-keto steroid may be prepared for example by reacting the steroid ketone with the appropriate dithiol, e.g. ethane dithiol, in the presence of hydrogen chloride.

It is preferred to carry out the reduction of the dithioketal employing an alkali metal and it is preferred to carry out the reduction in liquid ammonia.

The reduction of the dithioketal by means of an alkali metal or alkaline earth metal in liquid ammonia may be conveniently effected by adding a solution of the dithioketal in an inert organic solvent to a solution of the metal in liquid ammonia and after the reaction is complete adding ethanol or other suitable agent to destroy any excess metal. The time of reaction will depend on the reactants used: it may be as low as 10–30 minutes in the case of lithium or potassium but may be about an hour in the case of sodium.

The reaction may, alternatively, be effected by adding the metal to a preformed mixture of a solution of the dithioketal and ammonia.

Suitable solvents for the dithioketal include acyclic ethers, such as diethyl ether, cyclic ethers, for example tetrahydrofuran, or other inert organic solvents such as toluene. Diethyl ether has been found to be particularly suitable as solvent for the dithioketal. Other agents besides ethanol for destroying any excess metal include for example, ammonium salts, water and bromobenzene.

It has been found convenient to employ an excess of metal in the reduction, suitable proportions being from 6 to 24 equivalents of metal to one mole of dithioketal.

The reduction of the dithioketal using an alkali metal or alkaline earth metal in a primary amine, e.g. ethylamine, may conveniently be effected by dissolving the dithioketal in the primary amine and adding small portions of the metal to the solution until a permanent blue colour indicates completion of the reduction, any excess metal then being destroyed by the addition of ethanol or other suitable agents as described above.

The resultant 9(11)-dehydro steroid may be recovered by evaporating off the solvent or when using amines, by extraction with a suitable solvent, e.g. chloroform, and then purified, e.g. by recrystallization.

The process according to the invention leads to good yields of a high quality product. Overall yields as high as 88% have been obtained.

The process according to the invention is particularly applicable to the conversion of a 3-lower alkanoate of 9(11)-dehydrohecogenin, for example 9(11)-dehydrohecogenin acetate, to 9(11)-dehydrotigogenin acetate. The lower alkanoate group is removed during the reduction and subsequent acetylation is required to obtain 9(11)-dehydrotigogenin acetate.

In order that the invention may be well understood the following examples are given by way of illustration only:

*Example 1.—Potassium in liquid ammonia*

9(11)-dehydrohecogenin acetate ethylene dithioketal (5 g.) in dry ether (30 ml.) was added slowly, with stirring, to a solution of potassium (3 g.) in liquid ammonia (150 ml.). Five minutes after the addition ethanol was added until the reaction mixture was colourless. Water was then added and the ammonia was evaporated. The residue was extracted with chloroform and the extract was washed with water, 2N-hydrochloric acid, water, sodium bicarbonate solution, and finally water. The extract was dried over anhydrous magnesium sulphate and evaporated to dryness under reduced pressure and the residue (4.58 g.) was treated with pyridine (10 ml.) and acetic anhydride (10 ml.) on a steam bath for 30 min. Evaporation of the reaction mixture and crystallisation of the residue from ethyl acetate gave 9(11)-dehydrotigogenin acetate (3.47 g., 83%), M.P. 204–207°, $[\alpha]_D$ —61° (c. 1.0 in $CHCl_3$). A second crop (0.31 g.) had M.P. 202–204°, $[\alpha]_D$ —61° (c. 1.0 in $CHCl_3$). Total yield, 90%.

*Example 2.—Sodium in liquid ammonia*

9(11)-dehydrohecogenin acetate ethylene dithioketal (3 g.) in dry ether (20 ml.) was added slowly, with stirring, to a solution of sodium (1 g.) in liquid ammonia (100 ml.). Twenty-five minutes after the addition, ethanol was added until the solution was colourless. It was then treated as in Example 1 to give 9(11)-dehydrotigogenin acetate (1.82 g., 73%), M.P. 205–207°, $[\alpha]_D$ —61.7° (c. 1.0 in $CHCl_3$). A second crop (0.055 g.) had M.P. 203–207°. Total yield 75%.

*Example 3.—Sodium in liquid ammonia*

9(11)-dehydrohecogenin acetate ethylene dithioketal was reduced with sodium in liquid ammonia as in Example 2, but the reaction time was extended from 25 minutes to 1 hour. 9(11)-dehydrotigogenin acetate (2.06 g., 82%) was obtained, M.P. 205–208°, $[\alpha]_D$ —60.5° (c. 1.8 in $CHCl_3$). A second crop (0.18 g.) had M.P. 200–204°. Total yield 89%.

*Example 4.—Calcium in liquid ammonia*

9(11)-dehydrohecogenin acetate ethylene dithioketal (3 g.) in dry ether (20 ml.) was added slowly with stirring, to a solution of calcium (2 g.) in liquid ammonia (100 ml.). Ten minutes after the addition, ethanol was added until the solution was colourless. The reaction mixture was then treated as in Example 1 to give 9(11)-dehydrotigogenin acetate (1.6 g., 64%), M.P. 203–207°, $[\alpha]_D$ —60.5° (c. 1.0 in $CHCl_3$).

*Example 5.—Lithium in liquid ammonia*

9(11)-dehydrohecogenin acetate ethylene dithioketal (3 g.) in dry ether (20 ml.) was added slowly, with stirring, to a solution of lithium (0.5 g.) in liquid ammonia (100 ml.). Twenty minutes after the addition, ethanol was added until the solution was colourless. It was then treated as in Example 1 to give 9(11)-dehydrotigogenin acetate (2.02 g., 80%), M.P. 205–208°, $[\alpha]_D$ —60° (c. 1.0 in $CHCl_3$). A second crop (0.223 g.) had M.P. 203–206°. Total yield 89%.

*Example 6.—Preparation of 9(11)-dehydrohecogenin acetate ethylene dithioketal and its reduction with lithium in liquid ammonia*

Dry ether (50 ml.) at 0° was saturated with hydrogen chloride. Ethanedithiol (1.16 ml., 1.3 equivs.) and 9(11)-dehydrohecogenin acetate (5 g.) were added with stirring. After 4 hours the reaction mixture was poured on to ice and extracted with ether. The extract was washed with N-sodium hydroxide solution and then with water. It was dried ($MgSO_4$) and evaporated to dryness under reduced pressure. The residue (6.12 g.) was reduced with lithium in liquid ammonia as in Example 5 to give 9(11)-dehydrotigogenin acetate (3.88 g., 80%), M.P. 206–208°, $[\alpha]_D$ —60.2° (c. 1.3 in $CHCl_3$). Further crops (0.205 g. and 0.144 g.) had M.P. 204–207° and 200–205° respectively. Total yield 87%.

*Example 7.—Lithium in ethylamine*

Lithium was added in small portions to a stirred solution of 9(11)-dehydrohecogenin acetate ethylene dithioketal (3 g.) in dry ethylamine (40 ml.) until a persistent blue colour was obtained. Ethanol was added until the solution was colourless, and the reaction mixture was treated as in Example 1 to give 9(11)-dehydrotigogenin acetate (1.854 g., 74%), M.P. 203–205°, $[\alpha]_D$ —60.5° (c. 1.0 in $CHCl_3$).

*Example 8.—Preparation of 9(11)-dehydrohecogenin acetate ethylene dithioketal and its reduction with potassium in liquid ammonia*

Dry ether (25 ml.) at 0° was saturated with hydrogen chloride, and the solution was diluted with dry ether (25 ml.). Ethanedithiol (1.16 ml., 1.3 equivs.) and 9(11)-dehydrohecogenin acetate (5 g.) were added with stirring. After 24 hours the solution was treated as in Example 6 and the crude thioketal was reduced with potassium in liquid ammonia as in Example 1. 9(11)-dehydrotigogenin acetate (3.86 g., 79.5%) was obtained, M.P. 205–208°, $[\alpha]_D$ —59.6° (c. 1.6 in $CHCl_3$). A second crop (0.4 g.) had M.P. 204–207°. Total yield 88%.

*Example 9.—Use of toluene as solvent*

9(11)-dehydrohecogenin acetate ethylene dithioketal (3 g.) in dry toluene (20 ml.) was added to a stirred solution of sodium in liquid ammonia as in Example 2. 9(11)-dehydrotigogenin acetate (1.82 g., 72.5%) was obtained, M.P. 204–208°, $[\alpha]_D$ —60.3° (c. 1.1 in $CHCl_3$). A second crop (0.232 g.) had M.P. 200–202°. Total yield 81.5%.

*Example 10.—Use of bromobenzene for the destruction of excess metal*

9(11)-dehydrohecogenin acetate ethylene dithioketal (3 g.) in dry ether (20 ml.) was added slowly, with stirring, to a solution of sodium (1 g.) in liquid ammonia (100 ml.). Seventeen minutes after the addition, bromobenzene was added until the solution was colourless (ca. 3 ml.). It was then treated as in Example 1 to give 9(11)-dehydrotigogenin acetate (1.75 g., 70%), M.P. 204–206° $[\alpha]_D$ —59.3° (c. 1.4 in $CHCl_3$). A second crop (0.333 g.) had M.P. 198–201°. Total yield 83%.

We claim:
1. A process for the reduction of a compound selected from the group consisting of 9(11)-dehydrohecogenin and a 3-lower alkanoate thereof to 9(11)-dehydrotigogenin which comprises forming the ethylene dithioketal of said compound and reducing this to said 9(11)-dehydrotigogenin by means of a metal selected from the group consisting of alkali metals and alkaline earth metals in a medium selected from the group consisting of liquid ammonia and primary amines containing 1–5 carbon atoms.

2. A process as defined in claim 1 in which the reduction is effected by an alkali metal in liquid ammonia.

3. A process as defined in claim 1 in which 6 to 24 equivalents of metal are employed per mole of said ethylene dithioketal.

4. A process as claimed in claim 1 in which said ethylene dithioketal is dissolved in diethyl ether and the resulting solution is added to a solution of said metal in said medium.

5. A process as claimed in claim 1 in which 9(11)-dehydrohecogenin acetate is reduced to 9(11)-dehydrotigogenin which is then reacetylated to form 9(11)-dehydrotigogenin acetate.

References Cited by the Examiner

Djerassi et al.: "Journ. of Organic Chemistry" (1959), vol. 24, No. 1, pages 1–7.

Serota et al.: "J. of Organic Chemistry" (1960), vol. 25, No. 10, pages 1768–70.

LEWIS GOTTS, *Primary Examiner.*